United States Patent
Ouchi (10) Patent No.: US 6,753,829 B2
(45) Date of Patent: Jun. 22, 2004

(54) PROJECTION IMAGE DISPLAY APPARATUS

(75) Inventor: Akihiro Ouchi, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 325 days.

(21) Appl. No.: 09/897,078

(22) Filed: Jul. 3, 2001

(65) Prior Publication Data

US 2002/0005829 A1 Jan. 17, 2002

(30) Foreign Application Priority Data

Jul. 7, 2000 (JP) ........................................ 2000-207502

(51) Int. Cl.$^7$ ................................................ G09G 3/00
(52) U.S. Cl. .............................. 345/32; 345/30; 345/31; 345/89; 348/743; 348/744; 348/745; 348/746; 348/747; 348/748
(58) Field of Search ............................. 345/30, 31, 32, 345/89; 348/744, 745, 746, 747, 748, 743

(56) References Cited

U.S. PATENT DOCUMENTS

| | | | |
|---|---|---|---|
| 4,864,390 A | 9/1989 | McKechnie et al. | 358/60 |
| 5,233,385 A | 8/1993 | Sampsell | 355/35 |
| 5,650,832 A | * 7/1997 | Poradish et al. | 348/743 |

FOREIGN PATENT DOCUMENTS

| | | |
|---|---|---|
| JP | 4-6502 | 1/1992 |
| JP | 5-56440 | 3/1993 |
| JP | 7-222185 | 8/1995 |
| JP | 2726417 | 12/1997 |

* cited by examiner

Primary Examiner—Richard Hjerpe
Assistant Examiner—Jean Lesperance
(74) Attorney, Agent, or Firm—Fitzpatrick, Cella, Harper & Scinto (57) ABSTRACT

To change image quality in accordance with the image to be displayed, a color filter plate 3 is driven to sequentially split the white light incident on an A portion into red, blue, and green light beams to irradiate a liquid crystal panel, thus displaying a full-color image by a so-called field sequential scheme. In this case, if a sector region 4BG of an auxiliary filter plate 4 is always matched to the A portion (FIG. 2A), the quality of a full-color image is defined by the color filter plate 3, resulting in an increase in luminance. In contrast to this, when a red filter section 3R and auxiliary red filter section 4R are synchronously driven to be simultaneously irradiated with white light, the quality of a full-color image is defined by both the color filter plate 3 and the auxiliary red filter section 4R. As a consequence, an image with excellent color reproducibility is obtained. The image quality can be changed by selectively driving/non-driving the auxiliary filter plate 4 in accordance with the image to be displayed.

9 Claims, 12 Drawing Sheets

CHROMATICITY COORDINATES

FIG. 8

CHROMATICITY COORDINATES

FIG. 9

CHROMATICITY COORDINATES

PROJECTION IMAGE DISPLAY APPARATUS

BACKGROUND OF THE INVENTION

1. Field of the Invention

The present invention relates to a projection image display apparatus for making a user recognize a full-color image by synchronizing image display and light emission.

2. Related Background Art

Various conventional image display apparatuses for displaying images include apparatuses using CRTs, liquid crystal panels, and the like. Some apparatuses designed to display color images use sequential color schemes (field sequential scheme and color sequential switching scheme). The structure of an image display apparatus using such a scheme will be described below with reference to FIG. 14.

Figure 14:
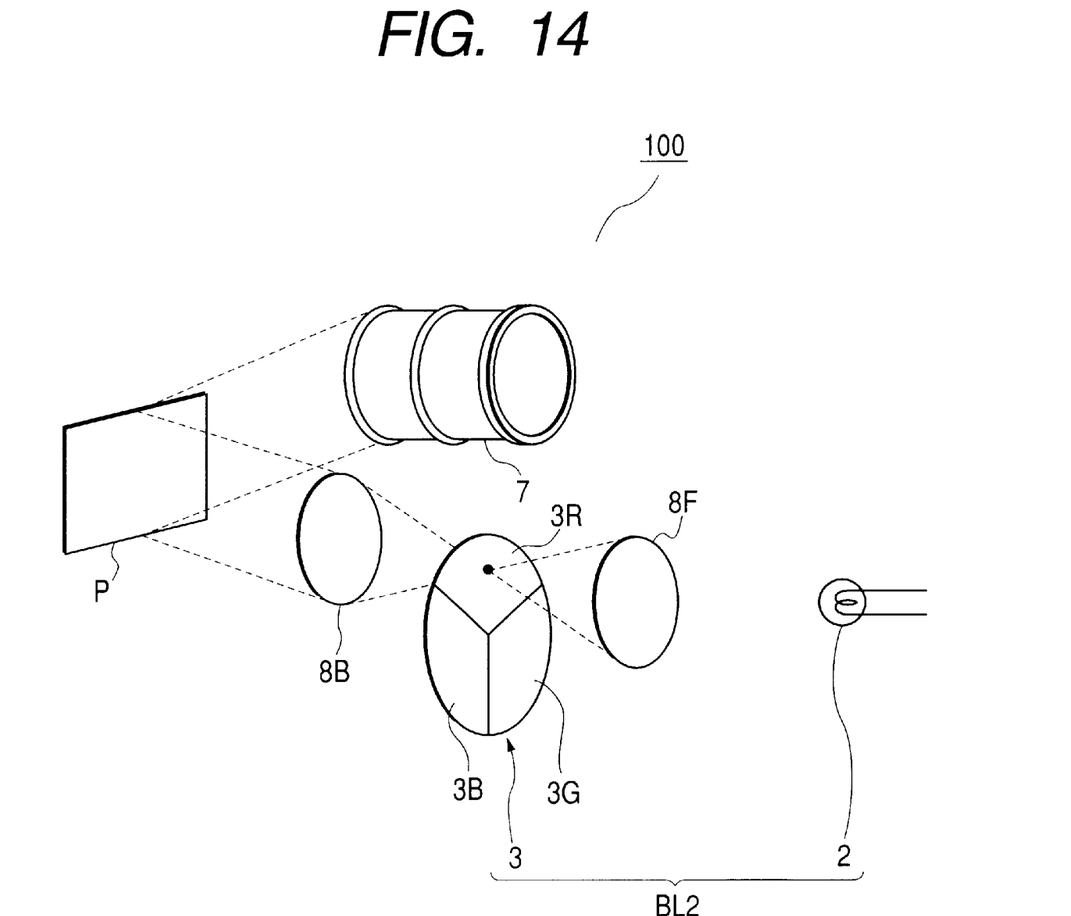
FIG. 14 is a schematic view for explaining an example of the structure of a conventional image display apparatus.

Referring to FIG. 14, an image display apparatus 100 of this type includes an image display element P for sequentially displaying gradation images and an illumination device BL2 for sequentially irradiating the image display element P with light beams of different colors. This apparatus is configured to make a user recognize each gradation image as a color image by synchronizing image display and light emission and make the user recognize a full-color image by color-mixing a plurality of color images.

The illumination device BL2 has a lamp 2 for emitting white light toward the image display element P and a color filter plate 3 which is placed between the image display element P and the lamp 2 and driven to rotate. The color filter plate 3 is divided into filter sections 3R, 3G, and 3B of three colors, i.e., red, green, and blue. When the color filter plate 3 is driven to rotate, white light is sequentially split into light beams of the respective colors, and the image display element P is sequentially irradiated with the respective color light beams. Note that as the lamp 2, a discharge lamp such as a metal halide lamp or mercury lamp having the characteristic shown in FIG. 6 (i.e., a continuous intensity distribution characteristic in the visible wavelength region of 400 nm to 700 nm) is used.

In such an apparatus, it is difficult to improve both the color reproducibility and luminance of a color image to be displayed. As the color reproducibility is improved, the image luminance decreases, and vice versa. The quality (i.e., color reproducibility and luminance) of a color image is uniquely determined by the arrangement of a color filter plate (the number of transmission light wavelength regions or segments). In one image display apparatus, all images are displayed with the same image quality, and the image quality cannot be changed according to user's taste.

Figure 3:
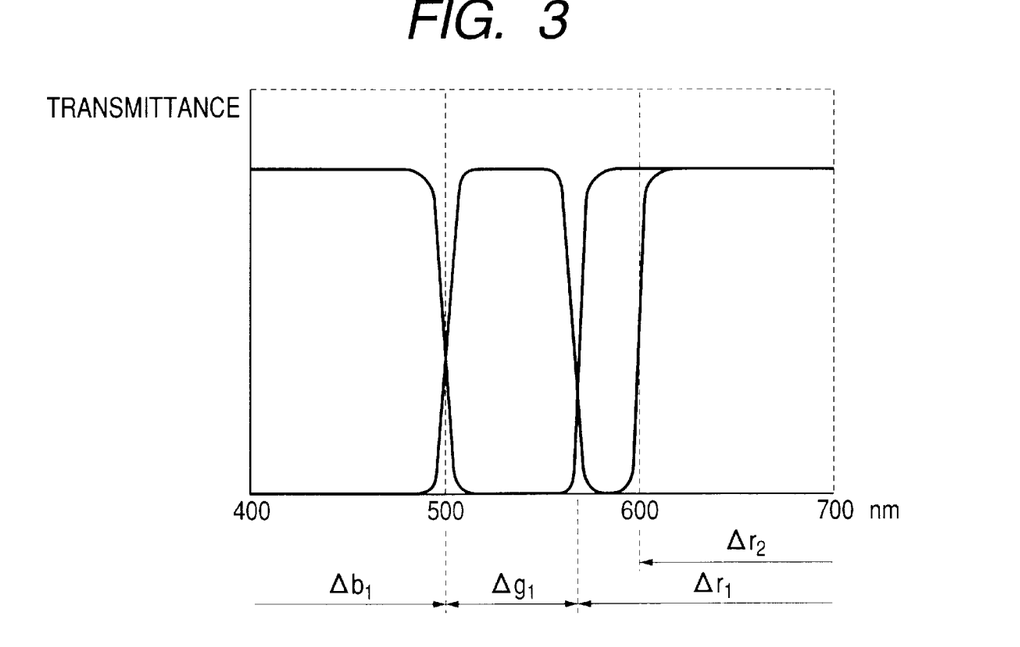
FIG. 3 is a view for explaining examples of the transmission light wavelength regions of a filter unit.

Assume that a transmission light wavelength region $\Delta_{r2}$ of the red filter section 3R (light transmitted through this filter section has a wavelength region of a certain width, which will be referred to as a wavelength region) is about 600 nm or more as shown in FIG. 3, a transmission light wavelength region $\Delta_{g1}$ of the green filter section 3G is about 505 nm to 570 nm as shown in FIG. 3, and a transmission light wavelength region $\Delta_{b1}$ of the blue filter section 3B is about 505 nm or less as shown in FIG. 3.

In this case, the color purities of light beams improve, and the color reproducibility of a full-color image improves. However, since narrow wavelength regions are used, the image luminance decreases. In contrast to this, if each wavelength region is broadened (for example, the transmission light wavelength region $\Delta_{r2}$ of the red filter section 3R is broadened to a region $\Delta_{r1}$) or the number of segments of the filter plate is increased to set segments of four colors, i.e., red, green, blue, and white (U.S. Pat. No. 5,233,385), the image luminance can be increased, but the color purity of each color light beam deteriorates, resulting in a deterioration in color reproducibility.

Other background arts are disclosed in Patent Registration No. 2726417 and Japanese Laid-Open Patent Application Nos. 7-222185, 5-56440, and 4-6502.

SUMMARY OF THE INVENTION

It is an object of the present invention to provide an image display apparatus which can adjust image quality in accordance with the image to be displayed.

In order to achieve the above object, there is provided a projection image display apparatus which comprises an image display element for sequentially displaying gradation images, and an illumination device for sequentially irradiating the image display element with light beams of different colors, and allows a full-color image to be recognized by synchronizing display of the images and light emission, wherein the illumination device includes a white light source for emitting white light toward the image display element, first filter means rotatably supported between the image display element and the white light source, first filter driving means for driving to rotate the first filter means, second filter means supported movably along the first filter means, and second filter driving means for driving or non-driving the second filter means in accordance with an image to be displayed, the first filter means is divided into at least first to third filter sections with different transmission light wavelength regions, and driven to rotate by the first filter driving means to sequentially insert the filter sections in an optical path of the white light, and the second filter means is driven by the second filter driving means such that, when the first filter section is inserted in the optical path of the white light, the second filter means is also inserted in the optical path, and, when the first filter section is removed from the optical path of the white light, the second filter means is also removed from the optical path.

BRIEF DESCRIPTION OF THE DRAWINGS

FIGS. (a) to (d) of FIG. 12 are charts for explaining the waveform of each signal in the color correction circuit shown in FIG. 10.

FIGS. (a) to (e) of FIG. 13 are charts for explaining the waveform of each signal in the color correction circuit shown in FIG. 11.

DETAILED DESCRIPTION OF THE PREFERRED EMBODIMENTS

Embodiments of the present invention will be described below with reference to FIGS. 1 to 12 and FIGS. (a) to (e) of FIG. 13.

Figure 1:
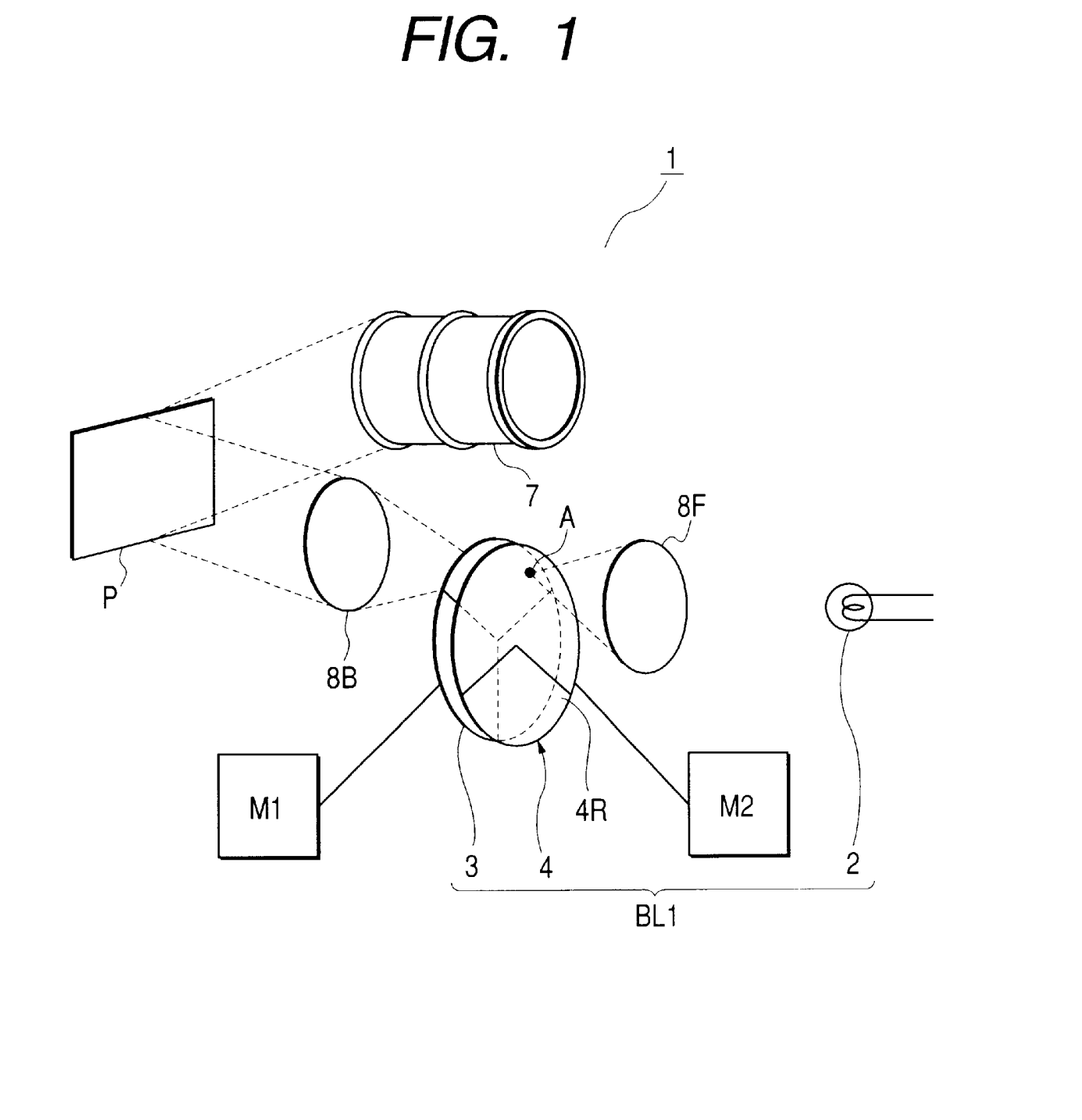
FIG. 1 is a schematic view showing an example of the arrangement of an image display apparatus according to the present invention.

Referring to FIG. 1, an image display apparatus 1 according to the present invention includes an image display element P for sequentially displaying gradation images and an illumination device BL1 for sequentially irradiating the image display element P with light beams of different colors. This apparatus is configured to make a user recognize each gradation image as a color image by synchronizing image display and light emission and make the user recognize a full-color image by color-mixing a plurality of color images.

Of these components, the illumination device BL1 is comprised of a white light source 2 for emitting white light toward the image display element P, a first filter unit 3 rotatably supported between the image display element P and the white light source 2, a first filter driving unit $M_1$ for rotating/driving the first filter unit 3, a second filter unit 4R of filter plate 4 is supported to be movable along the first filter unit 3, and a second filter driving unit $M_2$ for driving the second filter unit 4R.

Figure 2A:
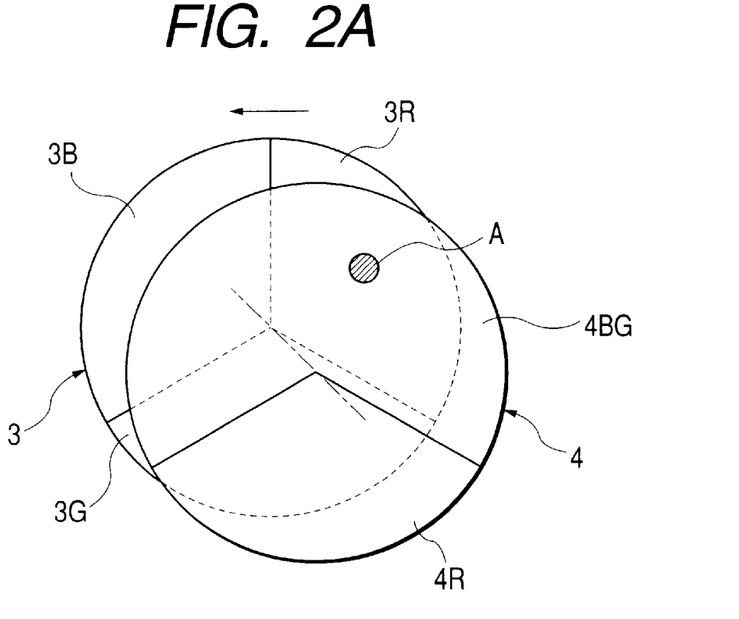
FIGS. 2A and 2B are views showing an example of the arrangement of a filter unit used in the present invention.
Figure 2B:
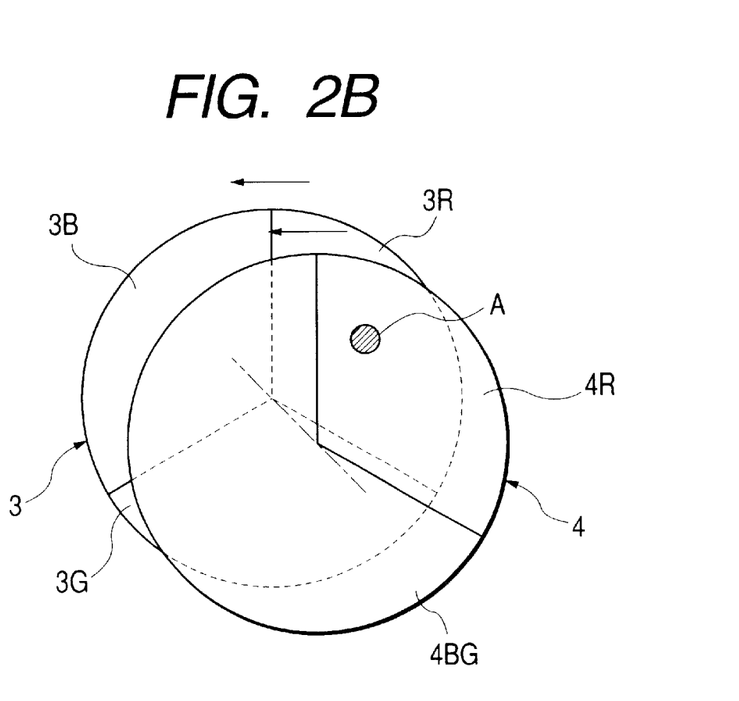

As shown in FIGS. 2A and 2B in detail, the first filter unit 3 is divided into at least first to third filter sections 3R, 3G, and 3B. These filter sections 3R, 3G, and 3B have different transmission light wavelength regions (light beams transmitted through the respective filter sections have wavelength regions of certain widths, which will be referred to as transmission light wavelength regions $\Delta_{r1}$, $\Delta_{g1}$, and $\Delta_{b1}$ as shown in FIG. 3), and are designed to transmit light beams of different colors. In addition, these filter sections 3R, 3G, and 3B are shaped such that when the first filter unit 3 is driven to rotate by the first filter driving unit $M_1$, the filter sections are sequentially inserted in the optical path of the above white light (see reference symbol A) (for example, they are shaped into sectors having equal central angles). With this structure, the image display element P is sequentially irradiated with light beams of different colors. In this case, the respective filter sections may be set as follows:

the filter section 3R is used as a red filter section for transmitting red light, and the second and third filter sections 3G and 3B are respectively used as a green filter section for transmitting green light and a blue filter section for transmitting blue light (when the second filter section is used as a blue filter section, the third filter section is used as a green filter, and vice versa). Referring to FIG. 3, the transmission light wavelength region $\Delta_{b1}$ of the blue filter section may be set to about 500 nm or less; the transmission light wavelength region $\Delta_{g1}$ of the green filter section, about 500 nm to 570 nm; and the transmission light wavelength region $\Delta_{r1}$ of the red filter section, about 570 nm or more.

Figure 4:
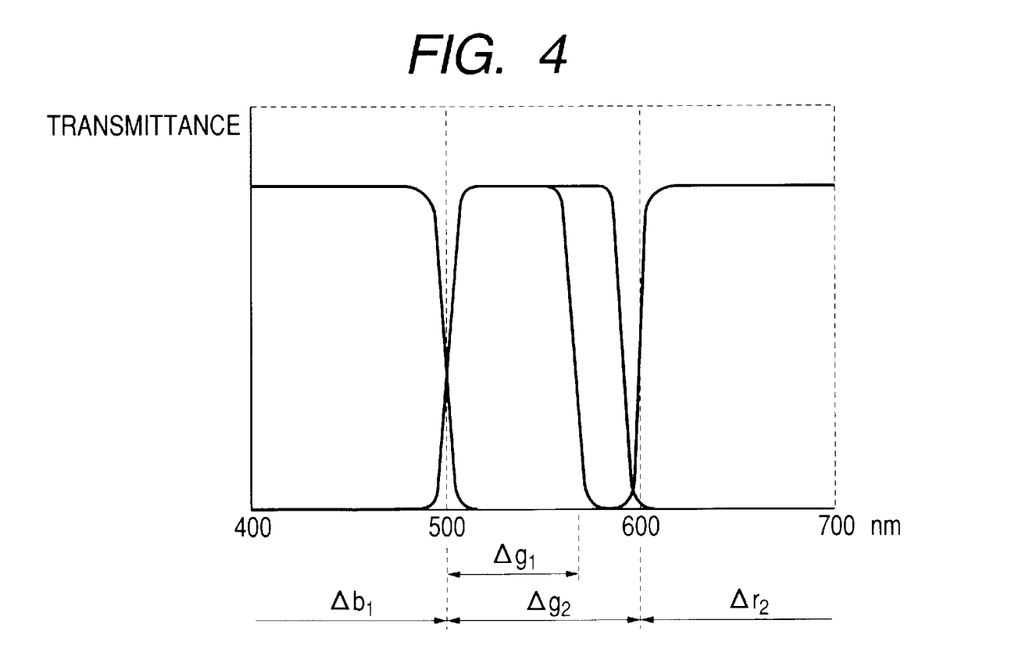
FIG. 4 is a view for explaining other examples of the transmission light wavelength regions of the filter unit.

The second filter unit 4R is set such that its transmission light wavelength region overlaps the first filter section 3R, and preferably set to have a transmission light wavelength region narrower than the first filter section 3R. If, for example, the transmission light wavelength region $\Delta_{r1}$ of the first filter section 3R is about 570 nm or more as shown in FIG. 3, a transmission light wavelength region $\Delta_{r2}$ of the second filter unit 4R may be set to about 600 nm or more. In this case, the second filter unit 4R is set to make its transmission light wavelength region overlap the red filter section 3R. Obviously, however, the present invention is not limited to this, and the transmission light wavelength region of the second filter unit 4R may overlap the blue filter section 3B or green filter section 3G (see FIG. 4). In the case shown in FIG. 4, the transmission light wavelength regions of the first to third filter sections 3R, 3G, and 3B may be set as indicated by reference symbols $\Delta_{r2}$, $\Delta_{g2}$, and $\Delta_{b1}$, and the transmission light wavelength region of the second filter unit 4R may be set as indicated by reference symbol $\Delta_{g1}$. Furthermore, settings may be made to make transmission light wavelength regions overlap each other for a plurality of colors instead of making transmission light wavelength regions overlap each other for one color.

In this apparatus, the second filter driving unit $M_2$ may drive and stop the second filter unit 4R in accordance with the image to be displayed. Note that the second filter driving unit $M_2$ may drive the second filter unit 4R such that when the first filter section 3R is inserted in an optical path A of the white light, the second filter unit 4R is also inserted in the optical path A, and when the first filter section 3R is removed from the optical path A of the white light, the second filter unit 4R is also removed from the optical path A. As described above, the transmission light wavelength region $\Delta_{r2}$ of the second filter unit 4R is set to overlap (or become narrower than) the transmission light wavelength region $\Delta_{r1}$ of the first filter section 3R. For this reason, when the two transmission light wavelength regions (i.e., both the second filter unit 4R and the first filter section 3R) are inserted in the optical path A of white light, transmitted light is light in the overlapping transmission light wavelength region. As a consequence, the transmission light wavelength region becomes narrower than that when only the first filter section 3R is inserted in the optical path A.

The second filter unit 4R in FIGS. 1 and 2A and 2B is rotatably supported like the first filter unit 3, and is also driven to rotate by the second filter driving unit $M_2$. Obviously, however, the present invention is not limited to this. As indicated by reference numeral 14 in FIGS. 5A and 5B, the second filter unit 4R may be reciprocally supported and driven by the second filter driving unit $M_2$ to reciprocate.

Figure 6:
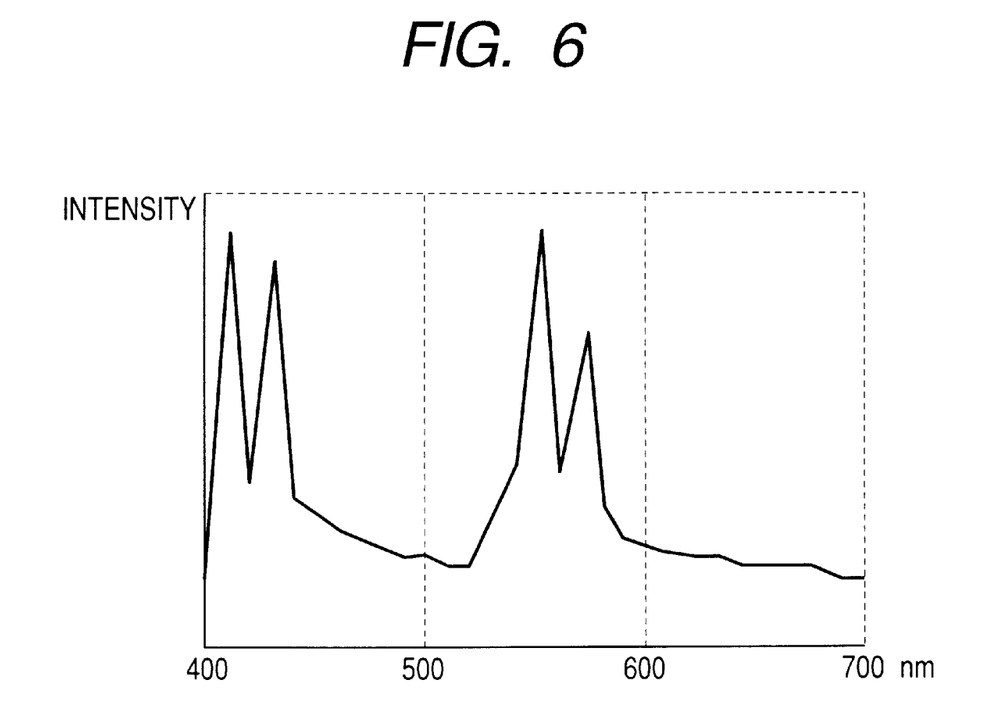
FIG. 6 is a graph for explaining the characteristics of a white light source used in the present invention.

As the lamp 2, a discharge lamp such as a metal halide lamp or mercury lamp having the characteristic shown in FIG. 6 (i.e., a continuous intensity distribution characteristic in the visible wavelength region of 400 nm to 700 nm) may be used.

In addition, the image display element P may be
a spatial modulation element using a liquid crystal such as a ferroelectric liquid crystal (FLC),
a MEMS (MicroElectro Mechanical Systems) type spatial modulation element typified by a Digital Mirror Device (DMD) available from TI, or
a spatial modulation element having an array of micro mirrors. This image display element P may be of a transmission or reflection type.

Figure 7:
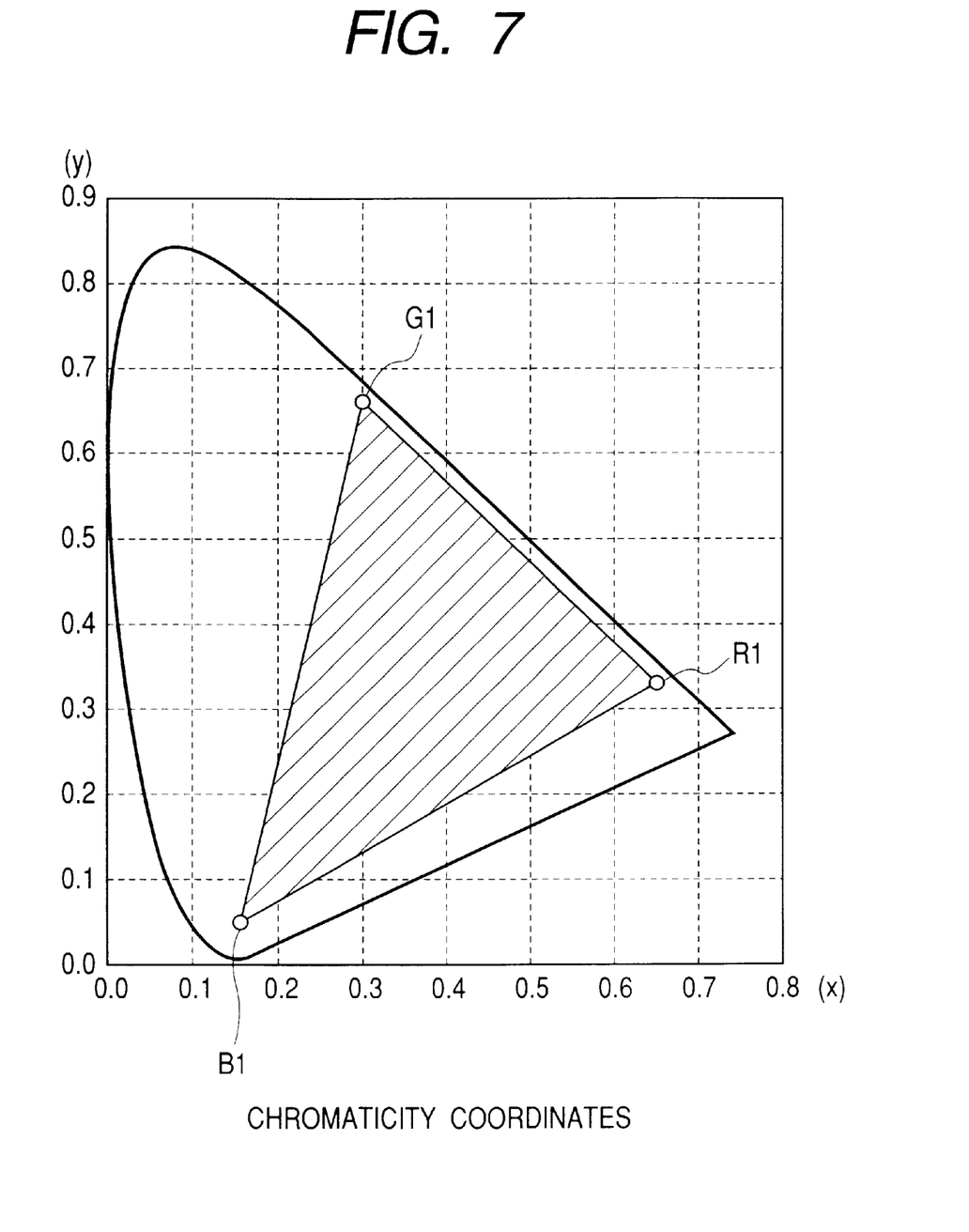
FIG. 7 is a chromaticity coordinate chart for explaining a color reproduction region obtained when a high priority is given to color purity.

When the second filter unit 4R is to be driven by the second filter driving unit $M_2$ in the above manner, the image display element P is sequentially irradiated with transmitted light (in the wavelength region $\Delta_{r2}$ instead of the wavelength region $\Delta_{r1}$) from the first filter section 3R and second filter unit 4R, transmitted light from the second filter section 3G, and transmitted light from the third filter section 3B. Since the color purity of each of these transmitted light beams is high (see reference symbols $\Delta_{r2}$, $\Delta_{g1}$, and $\Delta_{b1}$ in FIG. 3), the resultant color reproduction region becomes triangular as indicated by the hatching in FIG. 7, and the image display apparatus has good color reproducibility. That is, display is performed with a higher priority given to color reproducibility than to luminance.

Figure 8:
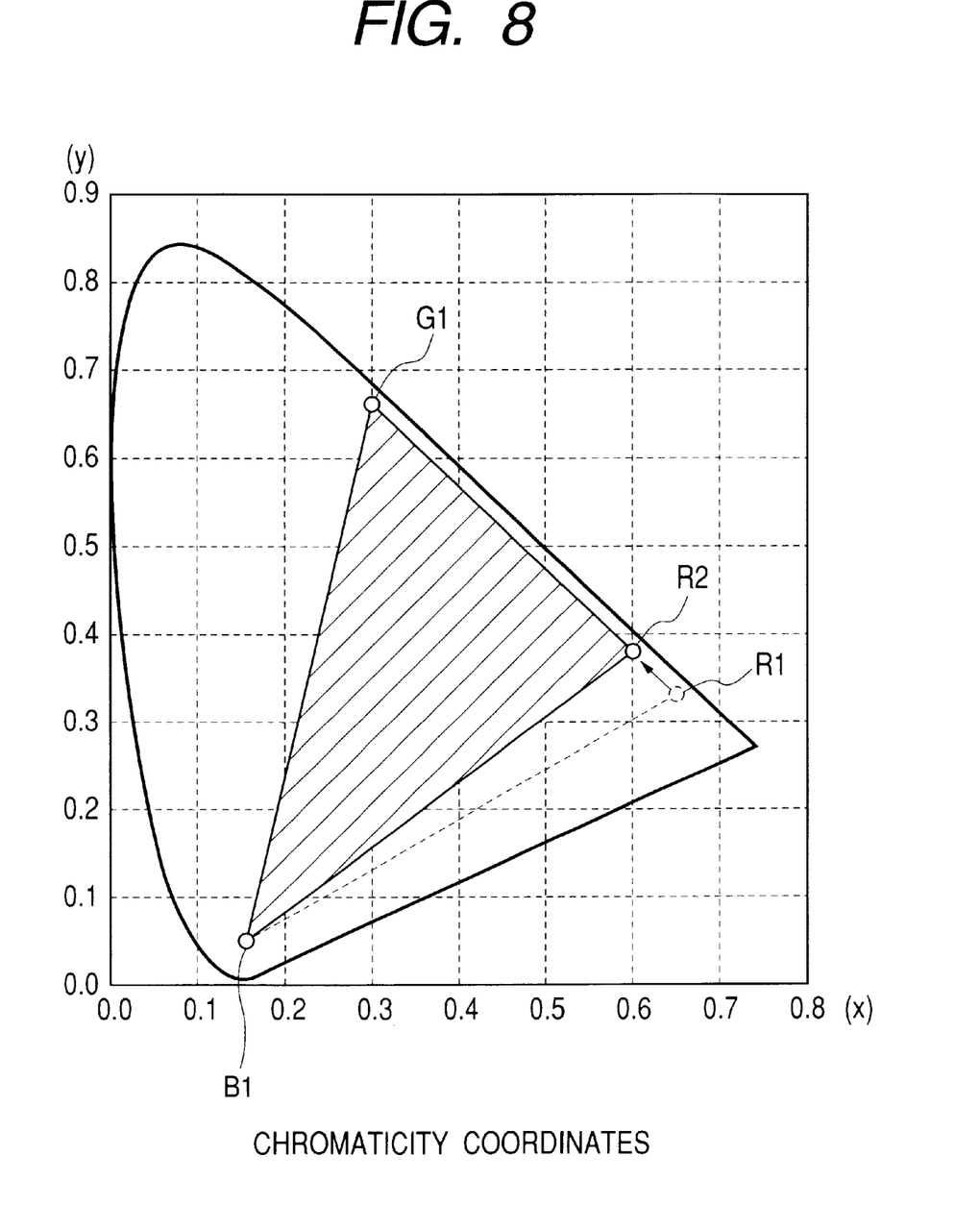
FIG. 8 is a chromaticity coordinate chart for explaining a color reproduction region obtained when a high priority is given to luminance.

In contrast to this, if the second filter unit 4R is not driven by the second filter driving unit $M_2$, the image display element P is sequentially irradiated with transmitted light (in the wavelength region $\Delta_{r1}$ instead of the wavelength region $\Delta_{r2}$) from the first filter section 3R, transmitted light from the second filter section 3G, and transmitted light from the third filter section 3B. Since the transmitted light from the first filter section 3R is in a wide wavelength region, the color purity is poor. Assume that the first filter section 3R is a red filter section for transmitting red light, and its transmission light wavelength region becomes wider toward green light. In this case, transmitted light from the first filter section 3R becomes orange as a mixture of red and green instead of red with high purity. The color reproduction region becomes triangular as indicated by the hatching in FIG. 8. In this case, the color reproducibility of the image display apparatus is not good, but the image luminance becomes high.

Figure 9:
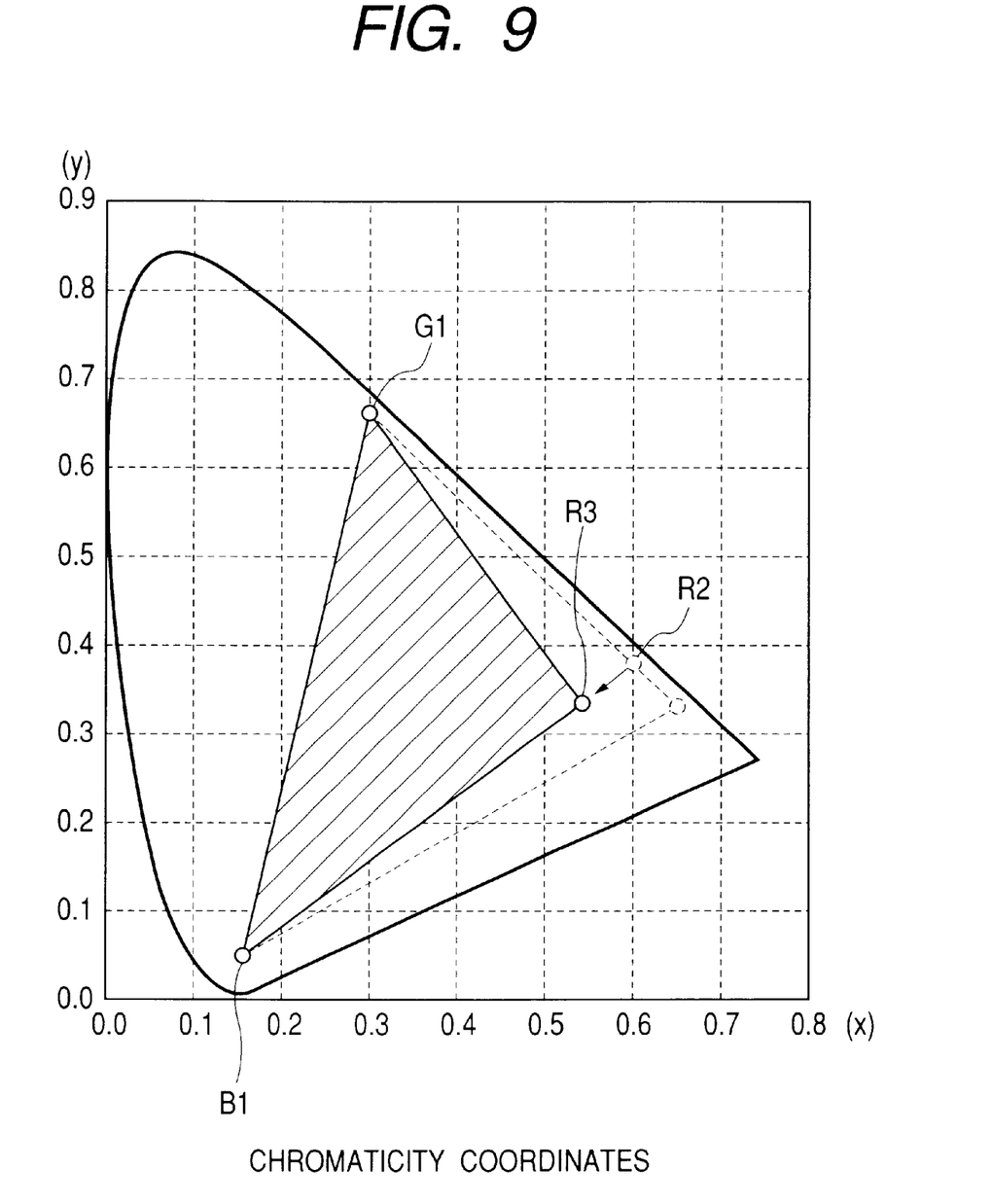
FIG. 9 is a chromaticity coordinate chart for explaining a color reproduction region obtained when color correction is performed.

A color correction circuit may be connected to the image display element P described above to correct a signal to the image display element P when the second filter unit 4R is not driven, thereby preventing a deterioration in color reproducibility. More specifically, when the transmission light wavelength region $\Delta_{r1}$ of the first filter section 3R is widened to be near the transmission light wavelength region $\Delta_{g1}$ of the second filter section 3G, a point R2 at which color reproduction is performed using only transmitted light from the first filter section 3R is moved to a point R3 (see FIG. 9) to perform color correction by adding transmitted light from the third filter section 3B, thereby forming the color reproduction region into the triangle indicated by the hatching in FIG. 9.

Figure 10:
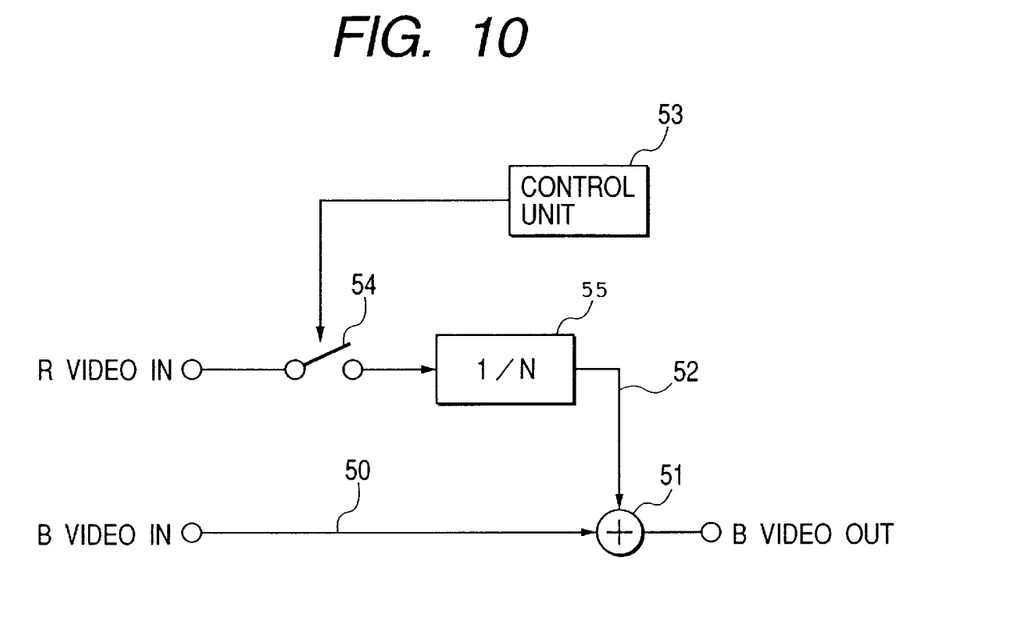
FIG. 10 is a block diagram showing an example of the detailed arrangement of a color correction circuit used in the image display apparatus according to the present invention.
Figure 11:
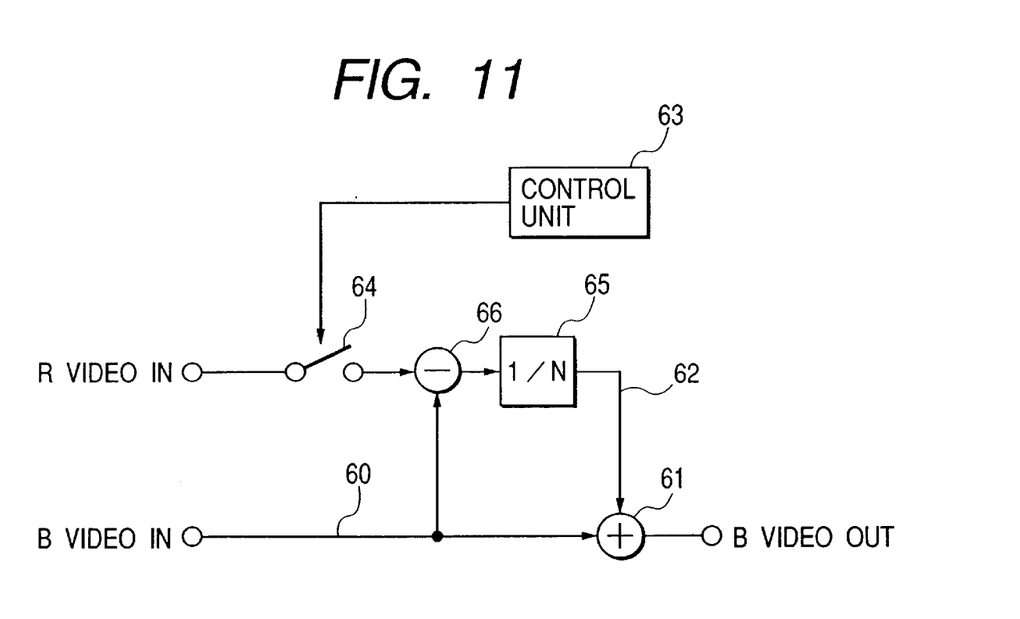
FIG. 11 is a block diagram showing another example of the detailed arrangement of the color correction circuit used in the image display apparatus according to the present invention.

FIG. 10 is a block diagram showing an example of the detailed arrangement of a color correction circuit used in the image display apparatus according to the present invention. FIG. 11 is a block diagram showing another example of the detailed arrangement of the color correction circuit used in the image display apparatus according to the present invention.

Figure 12:
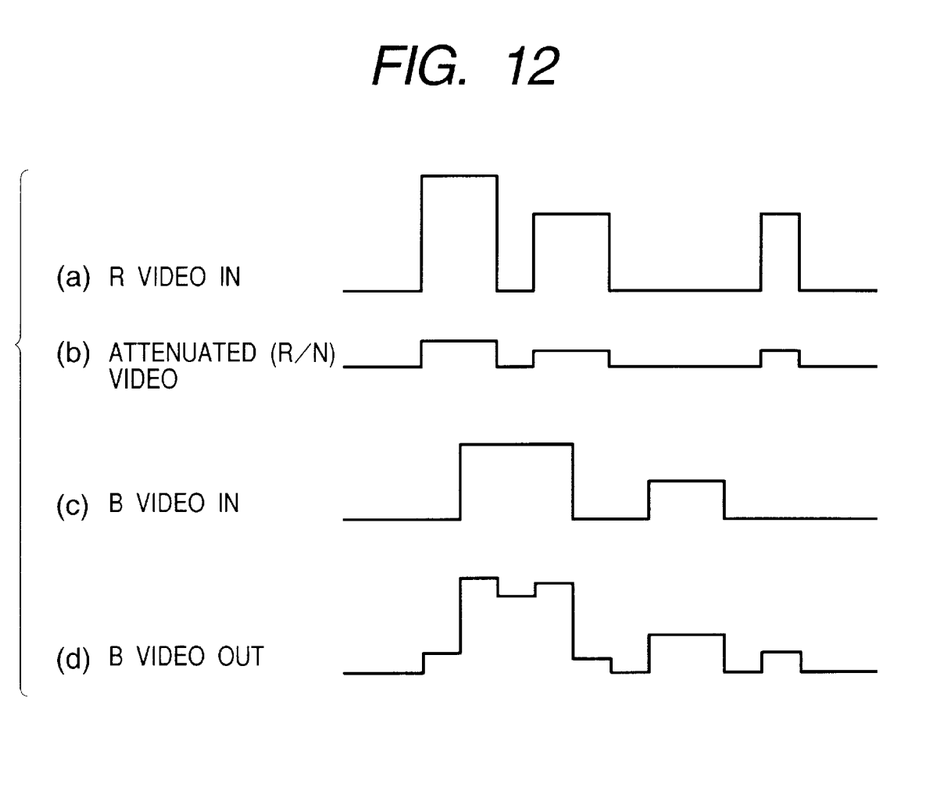

In the color correction circuit shown in FIG. 10, an addition unit 51 is inserted in a blue video signal line (third color video signal line) 50 extending to the image display element P, and a color correction signal line 52 is connected to the addition unit 51. A switch 54 ON/OFF-controlled by a control unit 53 and an attenuator unit 55 for attenuating a red video signal (first color video signal) in a predetermined ratio are inserted in this color correction signal line 52. When the second filter unit 4R is not driven by the second filter driving unit $M_2$, the control unit 53 turns on the switch 54 to make the attenuator unit 55 attenuate a red video signal (see FIGS. (a) and (b) of FIG. 12), and the addition unit 51 adds the red video signal to a blue video signal (third color video signal) (see FIGS. (c) and (d) of FIG. 12). An image is then displayed by the resultant signal.

Figure 13:
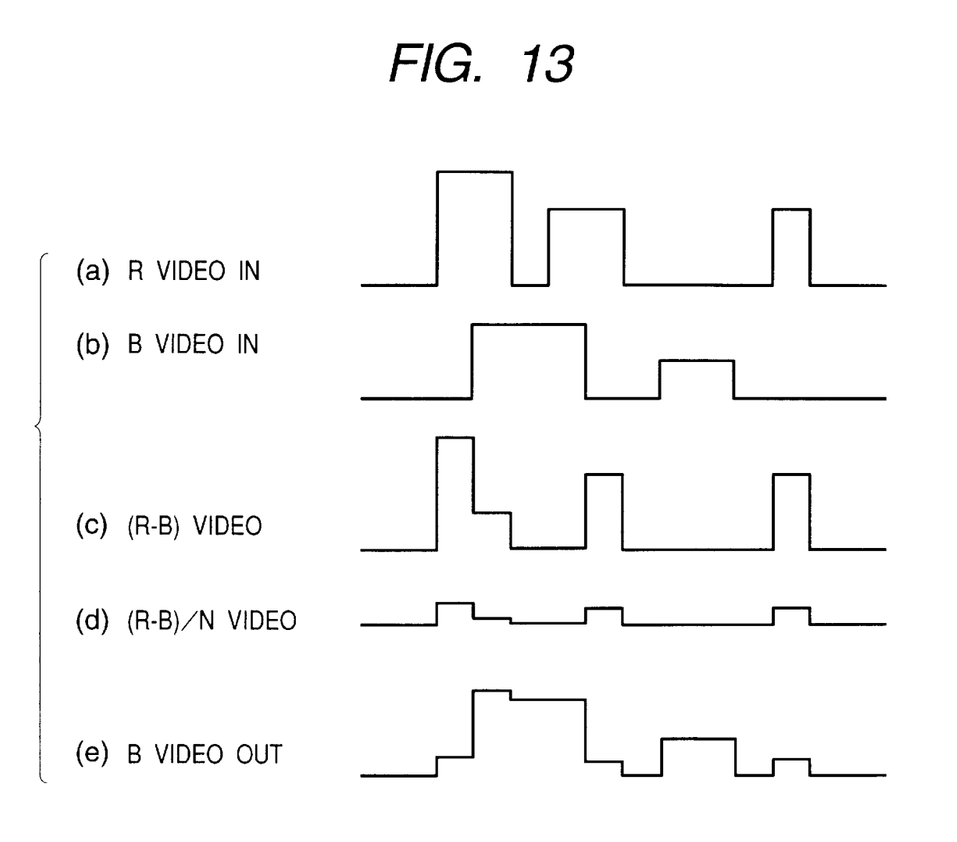

In the correction circuit shown in FIG. 11, an addition unit 61 is inserted in a blue video signal line (third color video signal line) 60 extending to the image display element P, and a color correction signal line 62 is connected to the addition unit 61. A switch 64 ON/OFF-controlled by a control unit 63, a subtraction unit 66 for generating a difference signal between a red video signal (first color video signal) and a blue video signal (third color video signal), and an attenuator unit 65 for attenuating the difference signal in a predetermined ratio are inserted in the color correction signal line 62. When the second filter unit 4R is not driven by the second filter driving unit $M_2$, the control unit 63 turns on the switch 64 to make the subtraction unit 66 generate a difference signal between a red video signal and a blue video signal (see FIGS. (a) to (c) of FIG. 13). This difference signal is attenuated by the attenuator unit 65 (see FIG. (d) of FIG. 13). The addition unit 61 adds the attenuated signal to the blue video signal (see FIG. (e) of FIG. 13). An image is then displayed by the resultant signal. Note that the subtraction unit 66 generates a difference signal when a red video signal (first color video signal) is larger than a blue video signal (third color video signal).

The operation of this embodiment will be described next.

When the first filter driving unit $M_1$ is activated while the second filter driving unit $M_2$ and second filter unit 4R are not activated and white light is emitted from the white light source 2, the first filter unit 3 is driven to rotate to sequentially split the white color incident on the first filter unit 3 into light beams of different colors. The image display element P is sequentially irradiated with these light beams.

An image signal (e.g., pulse-width-modulated image signal) is input to the image display element P, and a gradation image is displayed in synchronism with the light emission. With this operation, the displayed gradation image is recognized as a color image, and a mixture of a plurality of color images is recognized as a full-color image. The luminance and color reproducibility of this full-color image are defined by the first filter unit 3. That is, if the respective filter sections 3R, 3G, and 3B of the first filter unit 3 are set to increase their transmission light wavelength regions $\Delta_{r1}$, $\Delta_{g1}$, and $\Delta_{b1}$, the image luminance can be increased even though the color purity of each transmitted light deteriorates, resulting in a deterioration in color reproducibility.

The second filter driving unit $M_2$ is driven as well as the white light source 2, first filter driving unit $M_1$, first filter unit 3, image display element P, and the like, which are driven in the above manner. This makes it possible to irradiate the image display element P with the light transmitted through both the first filter section 3R and the second filter unit 4R. As a consequence, the wavelength region $\Delta_{r2}$ of the transmitted light is narrowed to improve its color purity (although it sacrifices the image luminance), thus improving the color reproducibility.

The effect of this embodiment will be described next.

According to this embodiment, when the second filter driving unit $M_2$ is driven, the color reproducibility can be improved by improving the color purity of transmitted light. When the second filter driving unit $M_2$ is stopped, the image luminance can be increased by widening each transmission light wavelength region. According to this embodiment, therefore, the quality (color reproducibility and image luminance) of a displayed image can be adjusted by driving or not driving the second filter driving unit $M_2$. This makes it possible to display various images with optimal image quality.

If the above color correction circuit is used, color correction of transmitted light can be performed when a transmission light wavelength region is widened. This makes it possible to improve color purity and color reproducibility.

The present invention will be described in more detail below in conjunction with embodiments.

(First Embodiment)

In this embodiment, a projection image display apparatus like the one shown in FIGS. 1, 2A, and 2B was used.

In this embodiment, a reflection liquid crystal panel P was used as an image display element, and gradation images were sequentially displayed by using pulse-width-modulated image signals. A projection lens 7 was inserted in the side where light was reflected by the liquid crystal panel P, and a screen (not shown) for projecting images was placed ahead of the projection lens 7.

An illumination device BL1 was placed to face the liquid crystal panel P to sequentially irradiate the liquid crystal panel P with light beams of three different colors (red, green, and blue). In this illumination device BL1, a metal halide lamp (white light source) 2 for emitting white light having the characteristic shown in FIG. 6 (i.e., a continuous intensity distribution characteristic in the visible wavelength region of 400 nm to 700 nm) toward the liquid crystal panel P was used, and a first condenser lens 8F for converging white light from the lamp 2, a rotatably supported color filter plate (first filter unit) 3, a rotatably supported auxiliary filter plate 4, a second condenser lens 8B for diverging the light transmitted through the filter plates 3 and 4 were sequentially arranged between the lamp 2 and the liquid crystal panel P.

The color filter plate 3 was driven to rotate by a motor (first filter driving unit) $M_1$, and the auxiliary filter plate 4 was driven to rotate by a motor (second filter driving unit) $M_2$.

As shown in FIGS. 2A and 2B in detail, the color filter plate 3 was divided into three sections, i.e., a red filter section (first filter section) 3R, blue filter section (second filter section) 3B, and green filter section (third filter section) 3G. These filter sections were set such that the red filter section 3R transmitted red light in a wavelength region of about 570 nm or more (see reference symbol $\Delta_{r1}$ in FIG. 3), the blue filter section 3B transmitted blue light in a wavelength region of about 500 nm or less (see reference symbol $\Delta_{b1}$ in FIG. 3), and the green filter section 3G transmitted green light in a wavelength region of about 500 nm to 570 nm (see reference symbol $\Delta_{g1}$ in FIG. 3).

In this case, according to the characteristics of the lamp 2, as shown in FIG. 6, outstanding peaks appeared in the wavelength region of about 570 nm to 600 nm, the light transmitted through the red filter section 3R (light in the wavelength region of about 570 nm or more) became yellowish orange rather than red.

A partial sector region (region 4R) of the auxiliary filter plate 4 is a region serving as the second filter means (to be referred to as an "auxiliary red filter section 4R" hereinafter). The transmission light wavelength region of this region is set to about 600 nm or more, which is narrower than the red filter section 3R. Note that a portion other than this auxiliary red filter section 4R (i.e., a sector region 4BG) transmits white light without any change.

The operation of this embodiment will be described next.

The auxiliary filter plate 4 is stopped so that the sector region 4BG coincides with the white optical path A. In this state, when the motor $M_1$ is activated to drive and rotate the color filter plate 3, white light is sequentially split into red, blue, and green light beams to irradiate the image display element P. At this time, since the transmission light wavelength region $\Delta_{r1}$ of the red filter section 3R is 570 nm or more, the light transmitted through the red filter section 3R becomes orange as a mixture of red and green instead of red with high purity.

An image signal is input to the image display element P, and a gradation image is displayed in synchronism with the above light emission. Each incident color light beam is reflected by the image display element P to be projected on the screen through the projection lens 7. As a result, a full-color image with high luminance is displayed on the screen.

The auxiliary filter plate 4 is driven by the motor $M_2$. The auxiliary filter plate 4 is driven such that when the red filter section 3R is inserted in the optical path A, the auxiliary red filter section 4R is also inserted in the optical path A, and when the red filter section 3R is removed from the optical path A, the auxiliary red filter section 4R is also removed from the optical path A.

With this operation, the red light incident on the image display element P is the light transmitted through both the red filter section 3R and the auxiliary red filter section 4R. This light is light in the overlapping wavelength region (about 600 nm or more), and hence the color purity improves.

As a consequence, the full-color image projected on the screen improves in color reproducibility although the luminance decreases.

The effect of this embodiment will be described next.

According to this embodiment, when both the color filter plate 3 and the auxiliary filter plate 4 are driven, the color purity of red light can be improved. In this case, since blue and green light beams inherently have high color impurities, the color reproducibility of the overall image can be improved. If the auxiliary filter plate 4 is not used, the transmission light wavelength region of red light is widened to increase the image luminance. According to this embodiment, therefore, the image quality (color reproducibility and image luminance) of a displayed image can be adjusted by using or not using the auxiliary filter plate 4. This makes it possible to display various images with optimal image quality.

(Second Embodiment)

Figure 5A:
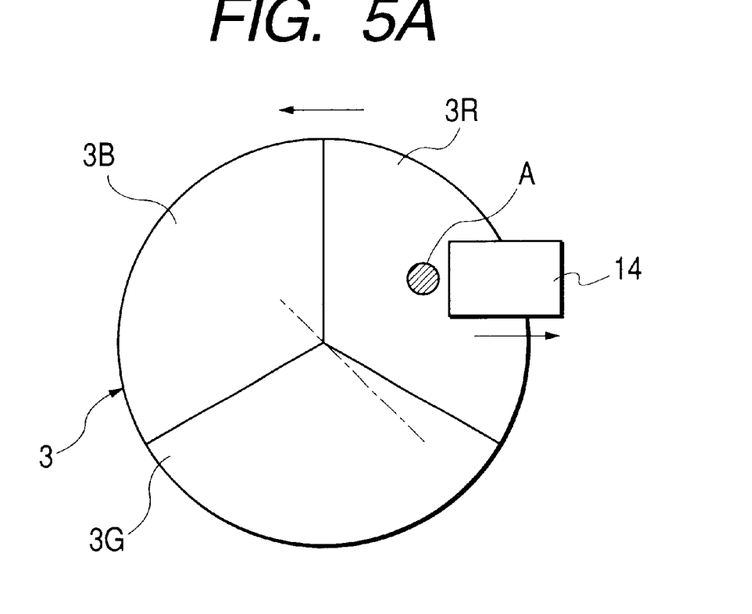
FIGS. 5A and 5B are views showing another example of the arrangement of the filter unit used in the present invention.
Figure 5B:
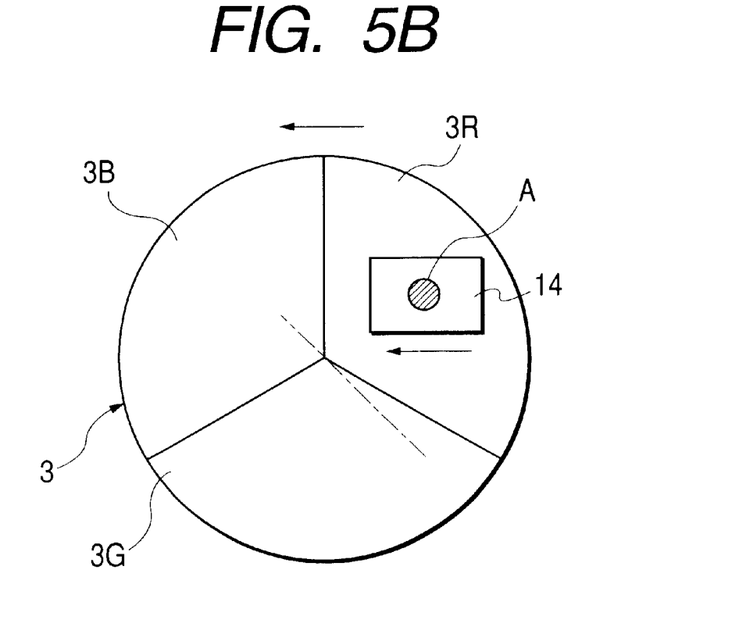

In the above embodiment, the auxiliary red filter section (second filter unit) 4R is rotatably supported and driven/rotated by the motor (second filter driving unit) $M_2$. In this embodiment, however, an auxiliary filter plate (second filter unit) 14 is designed to be reciprocally movable and reciprocally driven by a motor (second filter driving unit) (not shown), as shown in FIGS. 5A and 5B.

This auxiliary filter plate 14 is set to have a transmission light wavelength region narrower than that of a red filter section 3R. More specifically, this transmission light wavelength region is set to transmit light having a wavelength equal to or higher than about 600 nm. The auxiliary filter plate 14 is driven such that when a red filter section 3R is inserted in a white optical path A, the auxiliary filter plate 14 is also inserted in the optical path A, and when the red filter section 3R is removed from the white optical path A, the auxiliary filter plate 14 is also removed from the optical path A. The arrangement of the auxiliary filter plate 14 is the same as that in the first embodiment.

According to this embodiment, the same effect as that of the first embodiment can be obtained.

(Third Embodiment)

This embodiment uses an image display apparatus similar to that used in the first embodiment. In this apparatus, however, the color correction circuit shown in FIG. 10 is connected to a liquid crystal panel (image display element) P. Since this color correction circuit has already been described, a repetitive description thereof will be avoided.

According to this embodiment, similar to the first embodiment, when an auxiliary filter plate 4 is driven, an image with excellent color reproducibility can be displayed. When the auxiliary filter plate 4 is not driven, an image with high luminance can be displayed. In the latter case, since color correction is performed to a certain degree by the color correction circuit, the color reproducibility is also improved.

(Fourth Embodiment)

This embodiment also uses an image display apparatus similar to that used in the first embodiment. In this apparatus, however, the color correction circuit shown in FIG. 11 is connected to a liquid crystal panel (image display element) P. This color correction circuit has already been described, and hence a repetitive description will be avoided.

According to this embodiment, the same effect as that of the third embodiment can be obtained.

As has been described above, according to the present invention, when the second filter driving unit is activated, the color purity of transmitted light is improved to improve the color reproducibility. When the second filter driving unit is stopped, the transmission light wavelength region is widened to increase the image luminance. That is, according to the embodiments described above, the image quality (color reproducibility and image luminance) of a displayed image can be adjusted by driving or not driving the second filter driving unit. This makes it possible to display various image with optimal image quality.

In addition, if the above color correction circuit is used, color correction of transmitted light can be performed when the transmission light wavelength region is widened, thus improving color purity and color reproducibility.

What is claimed is:

1. A projection image display apparatus which comprises an image display element for sequentially displaying gradation images, and an illumination device for sequentially irradiating said image display element with light beams of different colors, and allows a full-color image to be recognized by synchronizing display of the images with light emission, wherein said illumination device includes a white light source for emitting white light toward said image display element, first filter means rotatably supported between said image display element and said white light source, first filter driving means for driving to rotate said first filter means, second filter means supported movably along said first filter means, and second filter driving means for driving or non-driving said second filter means in accordance with an image to be displayed, said first filter means is divided into at least first to third filter sections with different transmission light wavelength regions, and driven to be rotated by said first filter driving means to sequentially insert said filter sections in an optical path of the white light, and said second filter means is set to a transmission light wavelength region overlapping said first filter section, and is driven by said second filter driving means such that, when said first filter section is inserted in the optical path of the white light, said second filter means is also inserted in the optical path, and, when said first filter section is removed from the optical path of the white light, said second filter means is also removed from the optical path.

2. An apparatus according to claim 1, wherein said second filter means is set to a transmission light wavelength region narrower than said first filter section, and when said first filter section is inserted in the optical path of the white light, said second filter means is also inserted in the optical path to narrow the transmission light wavelength region.

3. An apparatus according to claim 1, wherein said first filter section comprises a red filter section for transmitting red light, and said second filter section comprises one of a blue filter section for transmitting blue light or a green filter section for transmitting green light, and said third filter section comprises the other of said blue filter section for transmitting blue light or said green filter section for transmitting green light.

4. An apparatus according to claim 3, wherein said blue filter section transmits blue light in a wavelength region of not more than about 500 nm, said green filter section transmits green light in a wavelength region of about 500 nm to 570 nm, and said red filter section transmits red light in a wavelength region of not less than about 570 nm.

5. An apparatus according to claim 1, wherein said second filter driving means drives to rotate said second filter means.

6. An apparatus according to claim 1, wherein said second filter driving means reciprocally drives said second filter means.

7. An apparatus according to claim 1, further comprising a color correction circuit for correcting a signal to said image display element when said second filter means is not driven.

8. An apparatus according to claim 7, wherein said color correction circuit comprises addition means inserted in a third color video signal line extending to said image display element, a color correction signal line connected to said addition means, a switch which is inserted in said color correction signal line and ON/OFF-controlled by control means, and attenuator means, inserted in said correction signal line, for attenuating a first color video signal in a predetermined ratio, and when said second filter means is not driven, said switch is turned on by the control means to cause said attenuator means to attenuate the first color video signal and cause said addition means to add the first color video signal to a third color video signal.

9. An apparatus according to claim 7, wherein
said color correction circuit comprises addition means inserted in a third color video signal line extending to said image display element, a color correction signal line connected to said addition means, a switch which is inserted in said color correction signal line and ON/OFF-controlled by control means, subtraction means, inserted in said color correction signal line, for generating a difference signal between the first color video signal and the third color video signal, and attenuator means, inserted in said color correction signal line, for attenuating the difference signal in a predetermined ratio, and when said second filter means is not driven, said switch is turned on by the control means to cause said subtraction means to generate a difference signal between the first color video signal and the third color video signal and cause said addition means to add the difference signal to the third color video signal.

* * * * *

UNITED STATES PATENT AND TRADEMARK OFFICE
CERTIFICATE OF CORRECTION

PATENT NO. : 6,753,829 B2
DATED : June 22, 2004
INVENTOR(S) : Akihiro Ouchi

It is certified that error appears in the above-identified patent and that said Letters Patent is hereby corrected as shown below:

<u>Column 9,</u>
Line 49, "image" (first occurrence) should read -- images --.

Signed and Sealed this

Sixteenth Day of November, 2004

JON W. DUDAS
*Director of the United States Patent and Trademark Office*